US009139058B2

(12) United States Patent
Livingstone et al.

(10) Patent No.: US 9,139,058 B2
(45) Date of Patent: Sep. 22, 2015

(54) FLEXIBLE TOW HOOK

(71) Applicant: FORD GLOBAL TECHNOLOGIES, LLC, Dearborn, MI (US)

(72) Inventors: Georgetta Livingstone, Clarkston, MI (US); Marwan Ahmad Elbkaily, Canton, MI (US); John Martin Knittel, Canton, MI (US); Douglas Lee Howe, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/010,295

(22) Filed: Aug. 26, 2013

(65) Prior Publication Data

US 2015/0054257 A1  Feb. 26, 2015

(51) Int. Cl.
*B60D 1/24* (2006.01)
(52) U.S. Cl.
CPC ..................................... *B60D 1/244* (2013.01)
(58) Field of Classification Search
CPC .............. B60D 1/18; B60D 1/28; B60D 1/04
USPC ......... 280/480, 446, 459, 483, 484, 485, 486, 280/487, 488, 489, 432; 267/71
See application file for complete search history.

(56) References Cited

U.S. PATENT DOCUMENTS

| 3,787,069 | A | * | 1/1974 | Chauncey | 280/486 |
| 4,240,647 | A | * | 12/1980 | Lewis | 280/482 |
| 4,988,974 | A | * | 1/1991 | Fury et al. | 340/431 |
| 5,072,964 | A | * | 12/1991 | Schule | 280/457 |
| 5,195,768 | A | * | 3/1993 | Hendrix | 280/428 |
| 6,050,587 | A | * | 4/2000 | Panhausen | 280/480 |
| 6,679,480 | B1 | * | 1/2004 | Hara et al. | 256/47 |
| 8,371,602 | B1 | * | 2/2013 | Peschansky et al. | 280/495 |

* cited by examiner

*Primary Examiner* — Joseph Rocca
*Assistant Examiner* — Jacob Knutson
(74) *Attorney, Agent, or Firm* — Joseph E. Root

(57) ABSTRACT

A flexible tow hook assembly for a vehicle. That assembly generally includes a front rail enclosing an inner region, a through-bolt assembly, and a cable. The through-bolt passes through and secured to the front rail section, and a support structure provides structural support to the front rail at an area where the through bolt is secured to the same. The cable is substantially flexible and a tie area is attached to the cable to form a figure-eight. The cable has a smaller loop, extending around the through-bolt, and a larger loop extending from the end of the front rail. The through-bolt may extend through the front rail vertically or horizontally. The support structure may be provided by an overlap area where rail members overlap, or by mounting plates secured to the surface of the front rail at the position where the through bolt extends through the same.

9 Claims, 4 Drawing Sheets

FLEXIBLE TOW HOOK

BACKGROUND

This application generally relates to accessories for vehicles, and more particularly to towing devices for vehicles.

Motor vehicles such as pick-up trucks typically have one or more tow hooks attached to their structure at suitable locations for towing purposes. Most often, tow hooks are mounted on the vehicle's front rail and extend through an aperture in the vehicle's bumper to project outwards. Some arrangements have tow hooks projecting from beneath the bumper in order to retain the vehicle's outer aesthetics. Tow hooks themselves are usually formed from solid material, such as steel. Typical shapes are hooks, lunettes, or elongated D's.

Conventional tow hook assemblies include one or more solid steel attachment devices, along with fasteners, shaped to receive a tow hook and attached to the vehicle's front rail. That structure strengthens the front rail locally, but it undesirably affects the vehicle during a crash event. Ideally, a vehicle is structured to absorb a crash impact in a predictable, progressive manner, following a pattern in which structural deformation starts at the vehicle's front, and progressively crumpling subsequent rearward. Adding a tow hook assembly to the front rail reduces the crushable zone and may require additional design actions to maintain planned crumpling during a front crash event.

In addition, the tow hook attachment may result in a longer vehicle, which may become a challenge when parking in tighter parking spaces. Vehicle storage may also prove difficult.

Another difficulty with conventional tow hook design arises in positioning standard sensors to a vehicle exterior. More particularly, as sensor systems, such as parking assist systems, have standard configuration and installation procedures, which may not accommodate differing tow hook designs and arrangements.

Thus, the art has yet to provide a tow hook assembly that allows for convenient towing and while also optimizing the vehicle's ability to absorb the crash energy.

SUMMARY

One aspect of the present disclosure describes a flexible tow hook assembly for a vehicle. That assembly generally comprises a front rail enclosing an inner region, a through-bolt assembly, and a cable. The through-bolt passes through and secured to the front rail section, and a support structure provides structural support to the front rail at an area where the through bolt is secured to the same. The cable is substantially flexible and a tie area is attached to the cable to form a figure-eight. The cable thus has a smaller loop, extending around the through-bolt, and a larger loop extending from the end of the front rail.

In other aspects of the present disclosure, the tow hook assembly may include one or more bushings carried on the through-bolt, assembled within and internally abutting the front rail. The bushings may position and center the cable's connection on the through-bolt. In other aspects of the present disclosure, the front rail is formed by an outer rail member and inner rail member, secured to form a tubular structure, the support structure including overlap areas where the outer rail and inner rail overlap. Alternatively, the support structure may include mounting plates. The cable may be formed of stainless steel.

Additional aspects, advantages, features and objects of the present disclosure would be made apparent from the drawings and the detailed description of the illustrative embodiments construed in conjunction with the appended claims that follow

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a vehicle tow hook assembly that enhances the ability to tow the vehicle without affecting the vehicle's ability to absorb a collision impact. To this end, the tow hook assembly includes a stainless steel cable projecting forward from a front rail. The cable assembly includes a through-bolt that passes through the rail cross-section and the stainless steel cable loops around the through-bolt, centered in position by a pair of bushings. A tie member forms the cable into a figure-eight, with a small loop encircling the through-bolt and a larger loop sized and positioned for receiving a tow hook.

Exemplary Embodiments

The present disclosure proposes a towing assembly that extends forward only slightly from the vehicle, mounted on the vehicle's front rail. That arrangement produces no increase in the overall vehicle length, while avoiding any compromise with towing capabilities. Moreover, the embodiments of the disclosed tow hook assembly are lighter than conventional designs, and they substantially flex.

Figure 1A:
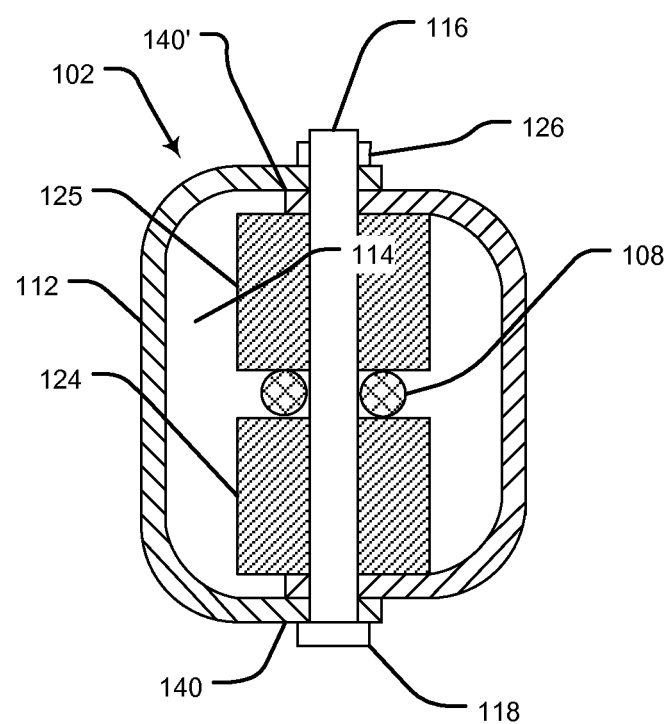
FIG. 1A is a cross-sectional front view of an exemplary vehicular front rail with a tow hook assembly, according to the aspects of the present disclosure.
Figure 1B:
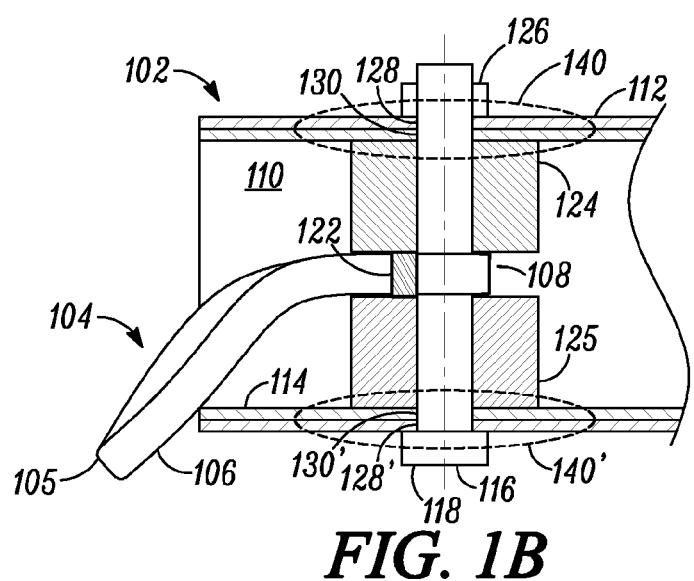
FIG. 1B is a longitudinal section of an exemplary vehicular front rail, incorporating a tow hook assembly according to the aspects of the present disclosure.
Figure 3:
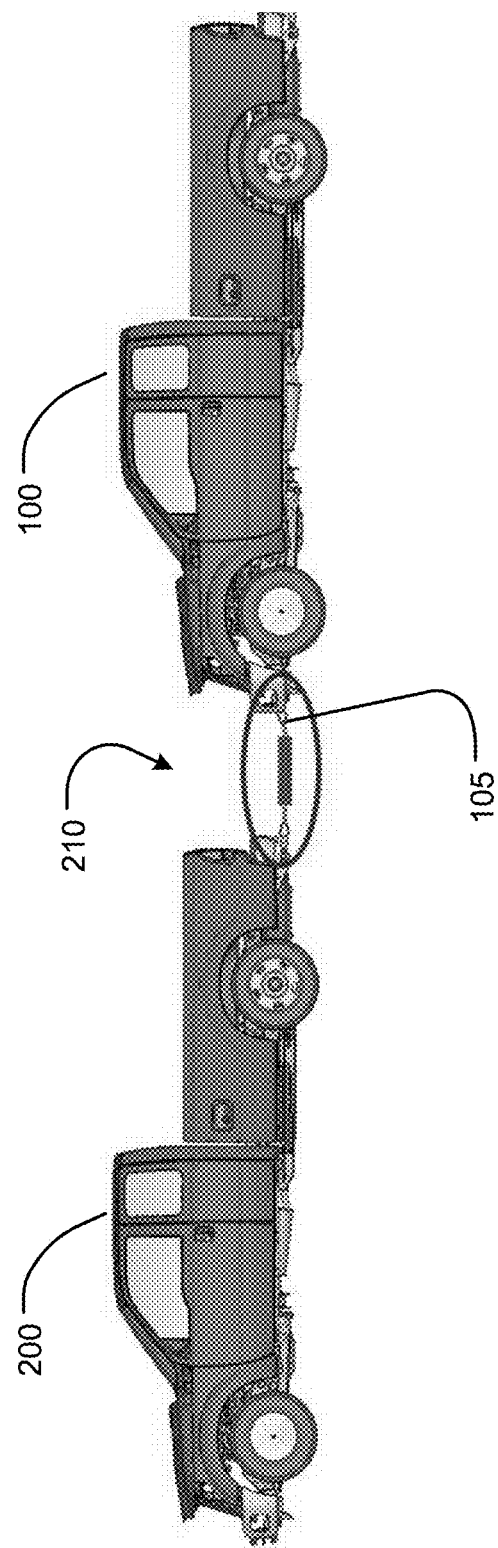
FIG. 3 schematically depicts an embodiment depicts an embodiment of the present disclosure, being towed by another vehicle.

Turning to FIGS. 1A and 1B, cross-sectional views of an exemplary vehicular front rail 102 are depicted. Here, a tow hook assembly 104, generally including a through-bolt 116 and a flexible cable 105, is mounted on a front rail 102. Generally, front rail 102 extends parallel to the longitudinal axis of the vehicle 100, through-bolt 116 extends vertically through the front rail 102, and flexible cable 105 extends forward from through-bolt 116, being accessible for receiving a tow hook 210 for towing by another vehicle 200, as shown in FIG. 3.

Front rail 102 can be formed by assembling an outer rail member 112 to an inner rail member 114. The outer and inner rail members 112, 114 are sheet metal components, generally U-shaped, assembled conventionally and welded to form a tubular front rail 102. These members may be stamped from heavy gauge sheet material, and they may be chrome plated for decorative purposes. Alternatively, the members may be hydroformed into a continuously closed rectangular section. The first outer rail member 112 is the larger, allowing inner member 114 to fit inside the outer rail member 112, and the two members are welded to form tubular front rail 102. The assembled unit defines and encloses an inner region 110. Alternative attachment techniques may be developed hereafter.

Rail members 112, 114 are assembled with top and bottom overlap areas, 140, 140'. In embodiments where front rail 102 is hydroformed, no overlap will be present. Both the outer and inner rails 112 and 114 have substantially circular apertures 128, 130, and 128' and 130', formed in overlap regions 140, 140' in such manner that they align when assembled.

Through-bolt 116 passes through outer and inner rails 112 and 114, secured by the bolt head 118 at one end and a nut 126 at the other. Suitable apertures to accommodate through-bolt 116 are formed in the rail members 114, 112 located in the overlap sections 140, 140'. Through-bolt 116 can be a conventional component, having sufficient strength properties to perform the required towing operations. The through-bolt can be a smooth rod threaded at one end, having a nut 126 threaded on it. Other fastening means, such as a pin or retainer assembly, could be employed, as known by those in the art. In some embodiments, the through-bolt 116 may have dimensions on the order ranging between M15M19. Optionally, grooves or protrusions may be formed on the outer bolt surface to facilitate attaching the cable 105 with tie member 122.

Bushings 124 and 125 are positioned on through-bolt 116, abutting the inner edges of the inner rail section 114. These elements are provided to maintain the position of cable 105 generally centered on through-bolt 116. The bushings can be formed as tubular sections with capped ends, having appropriate apertures at the end caps to accommodate the through-bolt 116. They can be made of galvanized steel to remain substantially free or resistant to oxidation and rusting throughout their operational life. Both the bushings 124 and 125 rotate freely on through-bolt 116, positioned to abut the inner walls of rail section 102.

Cable 105 is a flexible cable loop having sufficient strength to perform the required towing function. This cable extends around the through-bolt 116, as set out below, and it extends outside front rail 102 sufficiently to receive a tow hook (not shown) for towing. A tie member 122 ties the flexible cable 105 to form a figure-eight, having a smaller loop 108, passing around through-bolt 116 between the bushings 124, 125, and a larger loop 105 that extends forward to accommodate a tow hook. Detailed discussion of the cable is set out below.

The material for cable 105 is chosen to provide high tensile strength together with flexibility. This cable is preferably formed from stainless steel (SS), preferably of the type used in military or aerospace applications, and the cable is provided as a continuous loop, with varying length to accommodate the different sizes of trucks and respective rails. In general, the loop will have sufficient length to provide a larger loop 106 sized both to receive a tow hook and to extend from the through-bolt 116 to a position just beyond the end of the front rail 102. Those in the art may contemplate other materials, such as nylon or some type of composite material, selected to provide the required towing strength.

Tie member 122 forms cable 105 into a figure-eight, with a larger loop 106 and a smaller loop 108. The smaller loop 108 encircles through-bolt 106, lying between bushings 124, 125. The larger loop 106 extends forward from through-bolt 116, passing sufficiently beyond the end of front rail 102 to receive a tow hook (not shown) when a towing operation is required.

The tie member 122 may be any of the widely applied SS cable-tying members, applied in any conventional manner. Instead of the tie member 122, some applications may contemplate other suitable fastening means, or their combinations, for securing the cable. Further, the through-bolt 116 may be customized to hold the small loop 108, and accordingly, may include laterally wound grooves channels, or protrusions, as already noted, to restrict the cable's back and forth movements.

Figure 2A:
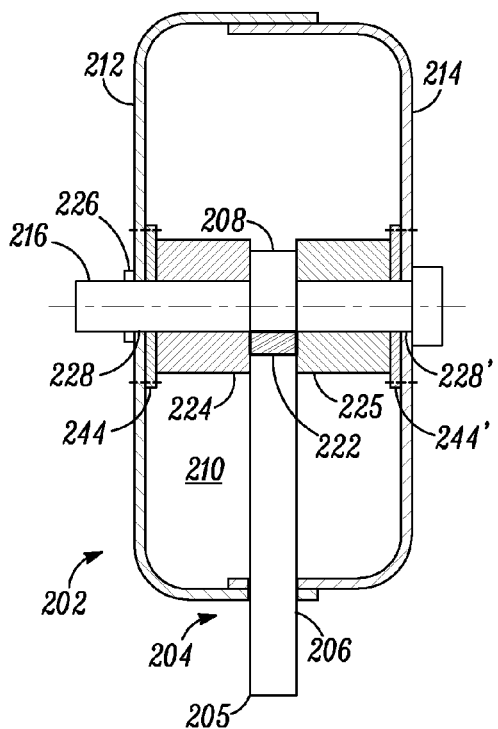
FIG. 2A and FIG. 2B are cross-sectional front views depicting embodiments of the tow hook assembly, according to the aspects of the present disclosure.

An alternative embodiment of the present disclosure is illustrated in FIG. 2A. Here, through-bolt 216 is oriented horizontally, rather than vertically. Apertures 228 and 228', corresponding to the apertures 128 and 130 in FIGS. 1A and 1B, are formed in a front rail 202, and through-bolt 216 passes through the apertures, secured in place by a nut 226.

In this embodiment, apertures 228, 228' pass through a portion of rail member 202 having only a single thickness, in contrast to the double-thickness location corresponding apertures in the embodiment of FIGS. 1A and 1B. To provide sufficient strength for towing, this embodiment provides plates 244 and 244', secured to the inner surfaces of inner and outer members 212, 214 and functioning as reinforcement members. These plates provide sufficient strength to support towing operations.

As described in connection with FIGS. 1A and 1B, a tie member 222 may form the cable 205 into a figure-eight as discussed above. Smaller loop 208 passes around through-bolt 216, and larger loop 206 extends forward, positioned to accept a tow hook (not shown) when required.

Bushings 224 and 225, structured as described above, are carried on through-bolt 216 to support and guide the cable 205. Other aspects of this embodiment are similar to those discussed above and thus will not be discussed further here.

Figure 2B:
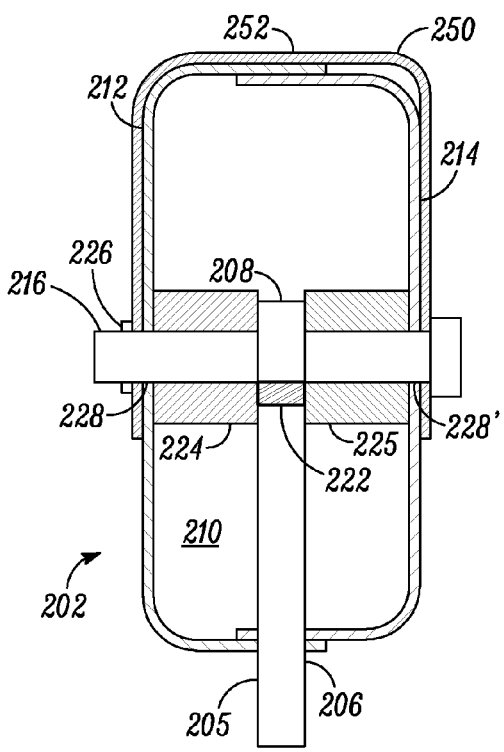

FIG. 2B sets out a variation on the embodiment set out in FIG. 2A. This embodiment also disposes through-bolt 216 horizontally, passing through a single-thickness portion of rail member 202. Rather than providing reinforcement through internally mounted plates, however, this embodiment includes an external member 250, a U-shaped member positioned over and at least partially surrounding the front rail 202. External member 250 may be secured to the front rail 202 by conventional means, such as welding. This arrangement provides sufficient strength in towing operations to prevent undesired deformation.

Other options may be utilized to position and assemble the enveloping member 250 to the front rail section 202. For example, external member 250 may be secured in place by the operation of through-bolt 216 itself. That option may be limited in efficacy, however, as a sole through-bolt connection may act as a pivot for the enveloping member 250. Therefore, the through-bolt 216, when employed alone as a fastening means, restricts the movement along certain degrees, but allows a possible back and forth swivel, which is undesirable. To counter such conditions, options may include an additional fastening means (not shown) to be driven through the enveloping member's free end 252, disposed at the right hand side, engaging the right hand side walls 209', 211' to avoid a component play arising out of a pivoting motion.

The tow hook assemblies 104 and 204 discussed above offer multiple advantages. First, the inclusion of simpler, lighter materials and an easier assembling process results in reduced manufacturing cost and time constraint. Structurally, the tow hook assemblies 104 and 204 lead to more simplified crash strategies. That is accomplished by leaving the front rail section substantially unchanged from its basic design, avoiding non-required stiffness. Further, the tow hook assemblies remain easily accessible to the user, as the larger loops 106 and 206 project out of the front rails 102 and 202. The cables 105 and 205 ensure a relatively flexible structure. Particularly advantageously, these advantages are gained without increasing overall vehicle length. Furthermore, sensor placement strategies may be left unchanged even when the tow hook requirements are non-standard.

The disclosed tow hook assembly may be applied in vehicular rear rail sections as well, requiring only the provision of a corresponding rail structure. Further, differing designs, shapes, and configurations of those rails, may not restrict the disclosed tow hook assembly's usability. For example, rails may be formed in any suitable metalworking process, from a suitable metal, or a combination of metals. In particular, hydroforming may prove a highly useful and convenient process for manufacturing the required rails. Further, through known mechanisms, one skilled in the art may form embodiments apart from those described to incorporate the disclosed tow hook assembly. As an example, even when the rails have been customized and varied to any known extent, those skilled in art can ascertain ways to incorporate the proposed tow hook's design and configuration.

The description illustrates aspects and embodiments of the subject matter and its implementation. This description should not be understood as defining or limiting the scope of the present disclosure, however, such definition or limitation being solely contained in the claims appended thereto. Although the best mode of carrying out the subject matter has been disclosed, those in the art would recognize that other embodiments for carrying out or practicing the subject matter are also possible.

Accordingly, those skilled in the art will understand that variations in these embodiments will naturally occur in the course of embodying the subject matter of the disclosure in specific implementations and environments. It will further be understood that such variations will fall within the scope of the disclosure. Neither those possible variations nor the specific examples disclosed above are set out to limit the scope of the disclosure. Rather, the scope of claimed subject matter is defined solely by the claims set out below.

We claim:

1. A flexible tow hook assembly for a first motor vehicle capable of being towed by a second motor vehicle, the first vehicle having a frame including a front rail, wherein the front rail is oriented generally parallel to a longitudinal axis of the first vehicle and encloses an inner region, the tow hook assembly comprising:
  a through-bolt assembly, including
    a through-bolt, oriented generally perpendicular to the longitudinal axis of the first vehicle, passing through and secured to the front rail, adjacent to a front end of the first vehicle,
    a support structure for providing structural support to the front rail at an area where the through-bolt is secured to the front rail;
  a metallic cable, substantially flexible, formed in a loop passing around the through-bolt within the inner region; and
  a tie member, tied to the cable to form a figure-eight therein, the cable having a smaller loop extending around the through-bolt and a larger loop extending from the front rail;
  wherein the larger loop is sized and positioned to accept attachment to a tow hook from the second vehicle.

2. The tow hook assembly of claim 1, where in the through-bolt assembly includes one or more bushings carried on the through-bolt, assembled within and abutting the front rail internally.

3. The tow hook assembly of claim 2, wherein the one or more bushings position and center the cable's position on the through-bolt.

4. The tow hook assembly of claim 2 wherein the support structure includes mounting plates.

5. The tow hook assembly of claim 1 wherein the front rail is formed by an outer rail member and inner rail member, secured to form a tubular structure, the support structure including overlap areas where the outer rail and inner rail overlap.

6. The tow hook assembly of claim 1, wherein the cable is made of stainless steel.

7. The tow hook assembly of claim 1 further comprising an enveloping member at least partially encompassing a portion of the front rail adjacent the through-bolt and being secured by the through-bolt.

8. The tow hook assembly of claim 1, wherein the front rail is hydroformed to provide a continuous rectangular cross-section.

9. The tow hook assembly of claim 1, wherein the cable is sufficiently long to extend from an end of the front rail.

* * * * *